United States Patent
Dutta et al.

(10) Patent No.: US 12,321,624 B1
(45) Date of Patent: Jun. 3, 2025

(54) MANAGING DATA STORAGE DEVICE FUNCTIONALITY BASED ON A DETERMINED WRITE ABORT PROBABILITY

(71) Applicant: Sandisk Technologies, Inc., Milpitas, CA (US)

(72) Inventors: Bishwajit Dutta, Bangalore (IN); Narendhiran Cr, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/649,352

(22) Filed: Apr. 29, 2024

(51) Int. Cl.
*G06F 3/00* (2006.01)
*G06F 3/06* (2006.01)

(52) U.S. Cl.
CPC .......... *G06F 3/0634* (2013.01); *G06F 3/0604* (2013.01); *G06F 3/0673* (2013.01)

(58) Field of Classification Search
CPC ..... G06F 3/0634; G06F 3/0604; G06F 3/0673
See application file for complete search history.

(56) References Cited

U.S. PATENT DOCUMENTS

| | | | | |
|---|---|---|---|---|
| 6,122,131 A | * | 9/2000 | Jeppson | G11B 5/5582 360/77.02 |
| 7,369,343 B1 | * | 5/2008 | Yeo | G11B 19/041 |
| 8,315,006 B1 | * | 11/2012 | Chahwan | G11B 19/042 360/78.04 |
| 2023/0376218 A1 | * | 11/2023 | Garcia Redondo | G06F 3/0619 |

* cited by examiner

*Primary Examiner* — Craig S Goldschmidt
(74) *Attorney, Agent, or Firm* — DENTONS Durham Jones Pinegar (57) ABSTRACT

A data storage device includes a write abort prediction system that monitors a number of write aborts that occur over a monitoring period. The write abort prediction system uses the monitored number of write aborts to predict or determine a probability regarding whether one or more write aborts will occur over another monitoring period. If the probability is over a write abort threshold, the write abort prediction system determines an operating state of the data storage device. Depending on the operating state of the data storage device and the determined probability, the write abort prediction system determines whether to alter the functionality of the data storage device. Altering the functionality of the data storage device reduces the risk that the data storage device will enter a read-only mode should one or more write aborts occur during execution of various commands.

20 Claims, 6 Drawing Sheets

| WRITE ABORT PROBABILITY | OPERATING STATE(S) | ENABLE ON-CHIP COPY? | ENABLE HYBRID BLOCKS? | ENABLE PROGRAM REORDERING? | ENABLE INFORM HOST? |
|---|---|---|---|---|---|
| LOW | SLC SUSTAINED & MLC BURST | YES | YES | NO | NO |
| HIGH | SLC SUPER URGENT & MLC SUSTAINED | NO | YES | YES | YES |
| VERY HIGH | SLC SUSTAINED & MLC BURST | YES | NO | YES | NO |

MANAGING DATA STORAGE DEVICE FUNCTIONALITY BASED ON A DETERMINED WRITE ABORT PROBABILITY

BACKGROUND

A data storage device, such as a NAND data storage device, typically includes a number of memory dies and each memory die is divided into a number of memory blocks. As the capacity of the data storage device increases, the size of each memory block is also increasing. However, because the size of each memory block is increasing, the total number of memory blocks per memory die is decreasing.

As the number of memory blocks decreases, the data storage device is at a higher risk of entering a read-only mode as a result of the occurrence of write aborts. For example, if a write abort occurs during a quad level cell (QLC) folding operation (e.g., when 4 single level cell (SLC) memory blocks are written or folded into a single QLC memory block), the QLC memory block is discarded and the folding operation is restarted. However, while the initial folding operation was occurring, the host device may still be writing to other SLC memory blocks. Because the size of the SLC memory block pool is smaller due to the decreased number of memory blocks, a risk of the data storage device entering a read-only mode, as a result of the write abort, increases.

In addition, QLC memory blocks and SLC memory blocks are typically associated with a predetermined number of program/erase (P/E) cycles. When a write abort occurs during the folding operation, the QLC memory block that is discarded is erased and subsequently prepared for use. However, this decreases the overall endurance of the data storage device.

Accordingly, it would be beneficial to reduce the risk of the data storage device entering a read-only mode as a result of the occurrence of write aborts while maintaining of prolonging the endurance of the data storage device.

SUMMARY

The present application describes a data storage device having a write abort prediction system that determines whether a write abort will during the execution of one or more operations received from a host device. For example, the write abort prediction system monitors a number of write aborts that occur on the data storage device during a particular monitoring period. In an example, the monitoring period is a period of time. In another example, the monitoring period is based, at least in part, on an amount of data that is written to the data storage device.

When the number of write aborts during the particular monitoring period have been determined, the write abort prediction system determines a probability as to whether one or more write aborts will occur over another monitoring period. If the probability is over a write abort threshold, the write abort prediction system determines an operating state of the data storage device. In an example, the operating state of the data storage device is based, at least in part, on an amount of free memory blocks in the data storage device.

Depending on the operating state of the data storage device, the write abort prediction system determines whether to suspend the execution of one or more commands and/or whether to alter the functionality of the data storage device. In an example, the one or more commands that are suspended and/or altering the functionality of the data storage device includes postponing or delaying one or more commands that are identified as increasing a risk that the data storage device will enter a read-only mode should a write abort occur during execution of the identified commands.

Accordingly, examples of the present disclosure describe a method that includes causing a write abort prediction system to monitor a number of write aborts that have occurred on a data storage device during a first monitoring period. The method also includes causing the write abort prediction system to determine, based at least in part, on the number of write aborts, a probability of one or more additional write aborts occurring during execution of received commands during a second monitoring period. The write abort prediction system also determines whether the probability of one or more additional write aborts occurring during the second monitoring period is above a threshold. If it is determined that the probability of one or more write aborts occurring is above the threshold, the write abort prediction system determines an operating state of the data storage device. The write abort prediction system then alters functionality of the data storage device. In an example, the functionality that is altered is based, at least in part, on the operating state of the data storage device and the determined probability.

Other examples describe a data storage device that includes a controller and a write abort prediction system. In an example, the write abort prediction system monitors a number of write aborts that have occurred on the data storage device during a monitoring period. The write abort prediction system also determines, based at least in part, on the number of write aborts, a probability of one or more additional write aborts occurring when a predetermined amount of data is written to the data storage device. The write abort prediction system then determines whether the probability of one or more additional write aborts occurring is above a write abort threshold. If the write abort prediction system determines the probability is above the write abort threshold, the write abort prediction system determines an operating state of the data storage device. The functionality of the data storage device is then altered based, at least in part, on the determined operating state.

The present disclosure also describes a data storage device that includes means for monitoring a number of write aborts that have occurred on the data storage device during a first monitoring period and means for determining a probability of one or more additional write aborts occurring during a second monitoring period. The data storage device also includes means for determining whether the probability of one or more additional write aborts occurring during the second monitoring period is above a write abort threshold. The data storage device also includes means for determining an operating state of the data storage device. In an example, the means for determining the operating state of the data storage device determines the operating state of the data storage device based, at least in part, on the determined probability of one or more additional write aborts occurring being above the write abort threshold. The data storage device also includes means for altering a functionality of the data storage device. In an example, the functionality that is altered is based, at least in part, on the operating state of the data storage device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

A data storage device, such as a NAND data storage device, typically includes a number of memory dies. Each memory die is divided into a number of different memory blocks. Additionally, the data storage device includes at least two partitions—a cache partition and a primary storage partition. The cache partition includes a number of single-level cell (SLC) memory blocks and the primary storage partition includes a number of multi-level cell (MLC) memory blocks.

Host operations, such as write operations, are typically performed on the cache partition. Internal operations, such as relocation operations (e.g., compaction, folding, wear leveling) and/or garbage collection operations, are used to move data from the cache partition to the primary storage partition (or vice versa) and/or to free memory blocks for subsequent operations.

In some implementations, the data storage device implements a hybrid architecture in which one or more MLC memory blocks are identified as hybrid memory blocks. Each hybrid memory block is programmable in a first mode (e.g., a MLC mode) or a second mode (e.g., a SLC mode).

In some examples, as the capacity of the data storage device increases, the size of each memory block also increases. However, as the size of each memory block increases, the total number of memory blocks per memory die decreases.

As the number of memory blocks decreases, the data storage device is at a higher risk of entering a read-only mode as a result of the occurrence of one or more write aborts. For example, if a write abort occurs during a MLC folding operation, the MLC memory block is discarded and the folding operation is restarted. However, while the initial folding operation was occurring, the host device may still write to other SLC memory blocks-which further decreases the amount of available SLC memory blocks for subsequent operations. Should multiple write aborts occur before relocation and/or garbage collection operations are completed, the risk that the data storage device will enter a read-only mode increases.

In addition, MLC memory blocks and SLC memory blocks are typically associated with a predetermined number of program/erase (P/E) cycles. When a write abort occurs during the folding operation, the MLC memory block that is discarded is erased and subsequently prepared for use. However, this decreases the overall endurance of the data storage device.

To address the above, the present disclosure describes a data storage device that includes a write abort prediction system. The write abort prediction system determines whether the data storage device is at risk of experiencing a write abort during one or more programming operations. For example, the write abort prediction system monitors a number of write aborts that occur on the data storage device during a particular monitoring period.

When the number of write aborts during the particular monitoring period have been determined, the write abort prediction system determines a probability as to whether one or more write aborts will occur over another monitoring period. If the probability that one or more write aborts will occur over the second monitoring period is over a write abort threshold, the write abort prediction system determines an operating state of the data storage device. In an example, the operating state of the data storage device is based, at least in part, on an amount of free memory blocks in one or more partitions of the data storage device.

Depending on the operating state of the data storage device, the write abort prediction system determines whether to alter the functionality of the data storage device. In an example, altering the functionality of the data storage device includes, but is not limited to, postponing or delaying commands that are identified as increasing a risk that the data storage device will enter a read-only mode should one or more write aborts occur during execution of the identified commands. Altering the functionality of the data storage device will help reduce the risk of the data storage device entering a read-only mode and will reduce the frequency at which folding and/or relocation operations are disturbed. As such, data in MLC memory blocks may not need to be discarded as frequently when compared with current solutions.

Accordingly, many technical benefits may be realized including, but not limited to, reducing a risk of a data storage device entering a read-only mode, especially for data storage devices that are used in intermittent power supply environment or otherwise do not have battery back-ups, improving the endurance of the data storage device by reducing or eliminating erase cycles that occur as a result of write aborts, and improving the overall reliability of the data storage device.

These benefits, along with other examples, will be shown and described in greater detail with respect to FIG. 1-FIG. 7.

Figure 1:
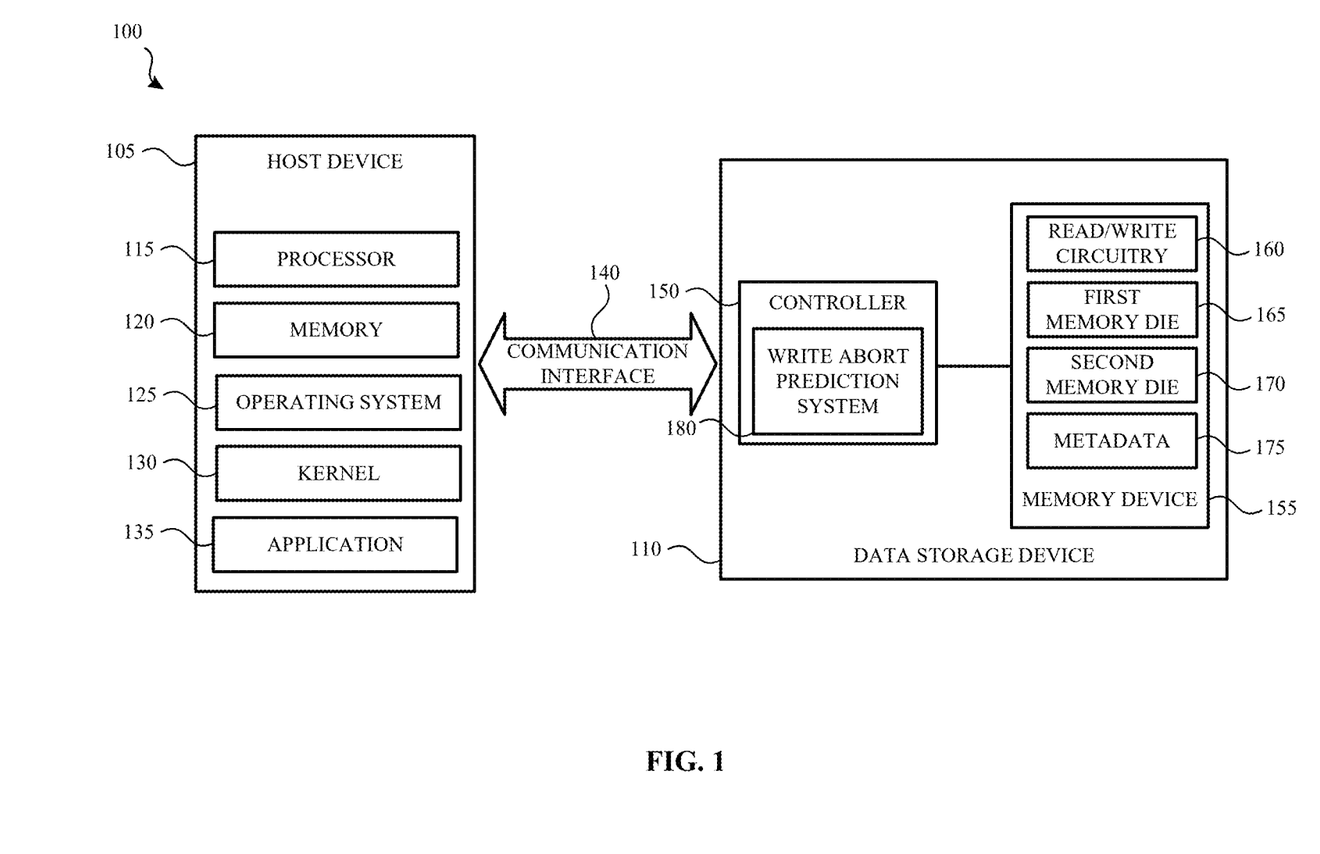
FIG. 1 is a block diagram of a system that includes a host device and a data storage device according to an example.

FIG. 1 is a block diagram of a system 100 that includes a host device 105 and a data storage device 110 according to an example. In an example, the host device 105 includes at least one processor 115 and a memory 120 (e.g., main memory). The memory 120 includes or is otherwise associated with an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 may include a System on a Chip (SoC).

In an example, the memory 120 is used by the host device 105 to store data used, or otherwise executed by, the processor 115. Data stored in the memory 120 may include instructions provided by the data storage device 110 via a communication interface 140. The data stored in the memory 120 may also include data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 also includes or is otherwise associated with a kernel 130. The kernel 130 includes instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

The data storage device 110 includes at least one controller 150 and at least one memory device 155. The controller 150 may be communicatively coupled to the memory device 155. In an example, the data storage device 110 may include multiple controllers. In such an example, one controller is responsible for executing a first operation or set of operations and a second controller is responsible for executing a second operation or set of operations.

In an example, the memory device 155 includes one or more memory dies (e.g., first memory die 165 and second memory die 170). Although two memory dies are shown, the memory device 155 may include any number of memory dies (e.g., one memory die, two memory dies, eight memory dies, or another number of memory dies). Additionally, although memory dies are specifically mentioned, the memory device 155 may include any non-volatile memory device, storage device, storage elements or storage medium including NAND flash memory cells and/or NOR flash memory cells.

In an example, one or more of the first memory die 165 and the second memory die 170 include one or more memory blocks. In an example, each memory block includes one or more memory cells. The memory cells can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

A block of memory cells is the smallest number of memory cells that are physically erasable together. In an example and for increased parallelism, each of the blocks are operated or organized in larger blocks or metablocks. For example, one block from different planes of one or more memory dies may be logically linked together to form a metablock.

In an example, the data storage device 110 and/or the memory device 155 includes, or are otherwise associated with, a first partition and a second partition and each partition includes different types of memory blocks. For example, the first partition is identified as a cache partition and includes a number of SLC memory blocks. The second partition is identified as a primary storage partition and includes a number of MLC memory blocks. Although MLC memory blocks are specifically mentioned, the primary storage partition may include TLC memory blocks, QLC memory blocks, and/or PLC memory blocks. Additionally, the data storage device 110 may implement a hybrid architecture. As such, a subset of the MLC memory blocks are identified as hybrid memory blocks. Each hybrid memory block may be programmable in a first mode (e.g., a MLC mode) or a second mode (e.g., a SLC mode).

In some examples, the data storage device 110 is attached to, or embedded within, the host device 105. In another example, the data storage device 110 is implemented as an external device or a portable device (e.g., a flash drive, a SD card) that is communicatively or selectively coupled to the host device 105. In yet another example, the data storage device 110 is a component (e.g., a solid-state drive (SSD)) of a network accessible data storage system, a network-attached storage system, a cloud data storage system, and the like.

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies includes corresponding read/write circuitry 160 that is operable to read data from and/or write data to storage elements within one individual memory die independent of other read and/or write operations on any of the other memory dies.

The memory device 155 also stores metadata 175. In an example, the metadata 175 includes information about the memory device 155 and/or information about each of the first memory die 165 and the second memory die 170. For example, the metadata 175 indicates a number of P/E cycles of each memory block (e.g., a QLC memory block) of each memory die, whether a particular memory block can be allocated as a hybrid memory block, a current operating state of each partition associated with the data storage device 110, a number of write aborts that have occurred during a monitoring period, a determined probability of another write abort occurring in another monitoring period, current functionality of the data storage device 110, altered functionality of the data storage device, a look-up table or other data that indicates functionality that should be enabled and/or disabled based on the determined operating state and/or on the determined write abort probability and so on.

As previously described, the data storage device 110 includes at least one controller 150. The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 receives data and/or instructions from the host device 105. The controller 150 also sends data to the host device 105. For example, the controller 150 sends data to and/or receives data from the host device 105 via the communication interface 140. The controller 150 also sends data and/or commands to and/or receives data from the memory device 155.

For example, the controller 150 sends data and a corresponding write command to the memory device 155 to cause the memory device 155 to store data at a specified address of the memory device 155. In an example, the write command specifies a physical address of a portion of the memory device 155. The controller 150 also sends data and/or commands associated with one or more background scanning operations, garbage collection operations, and/or wear leveling operations.

The controller 150 also sends one or more read commands to the memory device 155. In an example, the read command specifies the physical address of a portion of the memory device 155 at which the data is stored. The controller 150 also tracks the number of program/erase cycles or other programming operations that have been performed on or by the memory device and/or the memory dies of the memory device 155.

In an example, the controller 150 also includes or is otherwise associated with a write abort prediction system 180. The write abort prediction system 180 may be a packaged functional hardware unit designed for use with other components/systems, a portion of a program code (e.g., software or firmware) executable by a processor or processing circuitry, or a self-contained hardware and/or software component that interfaces with other components and/or systems.

The write abort prediction system 180 monitors or tracks the number of write aborts that occur over a particular monitoring period. In an example, the number of write aborts that are tracked is an average number of write aborts that occur over a moving/sliding monitoring period.

In an example, write aborts occur as a result of an ungraceful shutdown event such as, for example, a power failure. In another example, such as when the data storage device 110 is a removable or portable data storage device, write aborts occur as a result of the data storage device 110 being removed from the host device 105 before a pending operation (e.g., a write operation, a folding operation, a garbage collection operation) has completed. Although specific examples are given, a write abort can occur for any number of reasons. Regardless of the reasons, the write abort prediction system 180 tracks each occurrence of a write abort and/or determines the average number of write aborts over one or more monitoring periods.

In an example, the monitoring period is a period of time or a time interval. In an example, the period of time is adjustable. In another example, the period of time is a rolling/sliding window of time. In another example, the monitoring period is based, at least in part, on an amount of data that is written to the data storage device 110. For example, the monitoring period is based on an entire memory block's worth of data being written to a particular memory block (e.g., a SLC memory block or a QLC memory block).

When the write abort prediction system 180 has determined the number of write aborts that occurred during the monitoring period, the write abort prediction system 180 uses the information to determine a write abort probability associated with a second (or another) monitoring period. For example, the write abort prediction system 180 uses a moving average number of write aborts associated with one or more monitoring periods to determine the write abort probability for the second monitoring period. As with the initial or first monitoring period, the second monitoring period is a period of time and/or an amount of data that is written to the data storage device 110.

In another example, the write abort prediction system 180 uses a Poisson distribution to determine the write abort probability for the second monitoring period. In yet another example, the write abort probability is based on information in a look-up table, on machine learning and/or artificial intelligence and/or on other historical/usage data. In still yet other examples, the write abort probability is based on the type of data being stored by the data storage device 110, a type of data storage device, the type of commands that are provided by the host device 105 and various combinations thereof.

In an example, the write abort probability is a probability that indicates whether X amount of write aborts will occur over the second monitoring period (where X is a number between 0 and n). When the write abort probability is determined by the write abort prediction system 180, the write abort prediction system 180 also determines whether the write abort probability is over a write abort threshold.

In an example, the write abort threshold is a static or a dynamic value that indicates a number of write aborts that the data storage device 110 can safely handle. For example, the threshold number of write aborts indicates the number of write aborts that the data storage device 110 can handle without increasing (or minimally increasing) a risk of the data storage device 110 entering a read-only mode. In an example, the threshold is based, at least in part, on an operating state of the data storage device 110.

In yet another example, the write abort prediction system 180 bucketizes the write abort probability based on configurable thresholds. For example, if the write abort prediction system 180 determines that the write abort probability for the second monitoring period is two write aborts, the write abort prediction system 180 determines that the write abort probability is "low". Additionally, if the write abort prediction system 180 determines that the write abort probability for the second monitoring period is four write aborts, the write abort prediction system 180 determines that the write abort probability is "high". However, if the write abort prediction system 180 determines that the write abort probability for the second monitoring period is greater than four write aborts, the write abort prediction system 180 determines that the write abort probability is "very high".

Although a specific number of write aborts and associated buckets are mentioned, these are for example purposes only.

Based, at least in part, on the write abort prediction system 180 determining the write abort probability, the write abort prediction system 180 also determines an operating state of the data storage device 110. For example, if the write abort prediction system 180 determines the write abort probability is above the threshold or is in a particular bucket (e.g., the "high" probability bucket), the write abort prediction system 180 determines the operating state of the data storage device. In an example, the operating state of the data storage device 110 is based, at least in part, on an amount of free space that is available in or more partitions of the data storage device 110.

For example and as previously described, the data storage device 110 includes two different partitions—a cache partition and a primary storage partition. As the amount of available free space and/or as the number of memory blocks in each partition decreases, the operating state of the data storage device 110 changes. For example, as the amount of available free space in each partition decreases, the operating state of the data storage device 110 moves from a burst state to a sustained state, from the sustained state to an urgent state and from the urgent to a super urgent state.

Based on the write abort probability and/or the determined operating state, the write abort prediction system 180 determines whether to alter the functionality of the data storage device 110. In an example, altering the functionality of the data storage device 110 includes, but is not limited to, deferring or postponing one or more operations performed on or by the data storage device 110. In an example, the operations that are deferred or postposed are operations that are identified as being "high risk" or that would increase the risk of the data storage device 110 entering a read-only mode should one or more write aborts occur as the operations are being executed. Example high risk operations include, but are not limited to, on-chip copy operations and/or folding operations.

In another example, altering the functionality of the data storage device 110 includes, but is not limited to, enabling/disabling the use of hybrid memory blocks, enabling/disabling program reordering (e.g., programming all memory dies in sync in case of pending read/write operations and/or other operations) and/or enabling/disabling inform host capabilities (e.g., host device 105 is informed to only send high priority operations). Although specific examples are given, other functionalities of the data storage device 110 can be altered.

In an example, the data storage device 110 maintains a pre-configured look-up table that is based on the write abort probability and/or the current operating state of the data storage device 110. The write abort prediction system 180 uses the look-up table to determine which operations should be deferred and/or which capabilities should be at least temporarily suspended.

For example, if the write abort prediction system 180 determines that the write abort probability is "high" or "very high" and each partition (e.g., the SLC or cache partition and the MLC or primary storage partition) of the data storage device 110 are in a sustained state, the write abort prediction system 180 determines that on-chip copy functionality and hybrid functionality will be disabled. However, if cache partition is in an urgent state or a super-urgent state and the write abort probability is high, on-chip copy functionality and/or hybrid functionality is enabled. Although specific operating states, write abort probabilities and functionalities are described, these are for example purposes only. It is contemplated that different functionalities and abilities of the data storage device 110 can be enabled or disabled based on various combinations of write abort probabilities and determined operating states of the data storage device 110.

Figure 2:
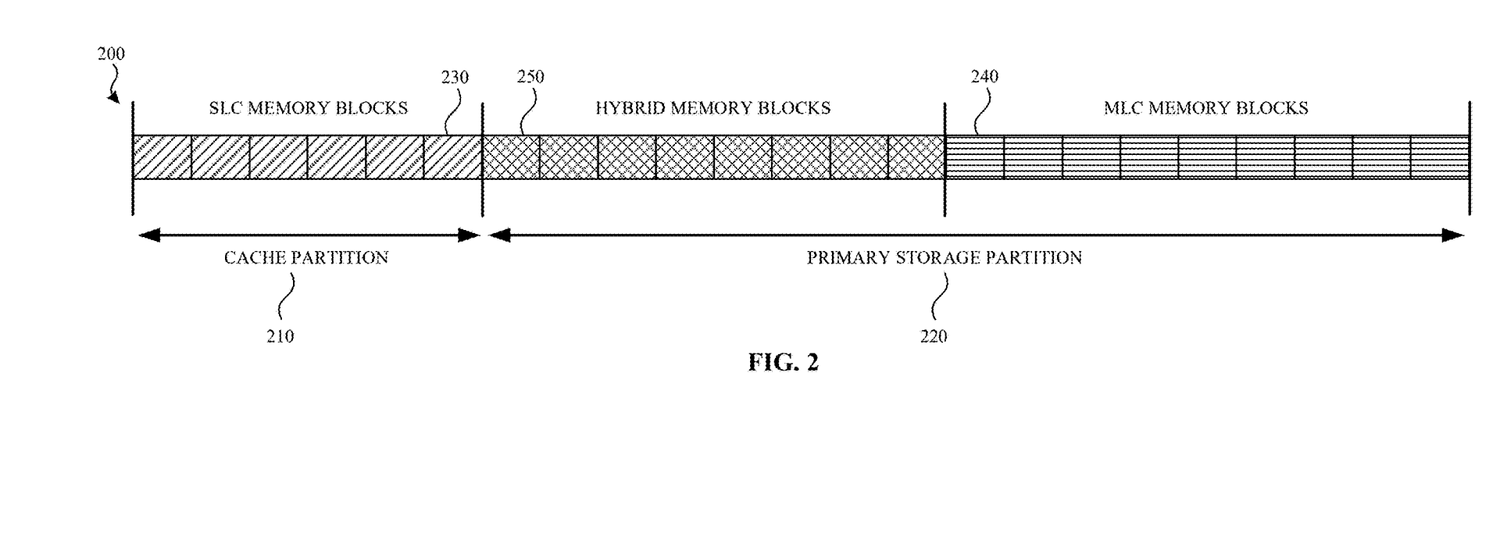
FIG. 2 illustrates a memory device having a first partition and a second partition according to an example.

FIG. 2 illustrates a memory device 200 having a first partition and a second partition according to an example. In an example, the memory device 200 is similar to the memory device 155 shown and described with respect to FIG. 1.

As previously indicated, the memory device 200 has two partitions. In an example, the first partition is a cache partition 210 and the second partition is a primary storage partition 220. The cache partition 210 includes memory blocks of a first type. For example, the cache partition 210 includes a number of SLC memory blocks 230. The primary storage partition 220 includes memory blocks of a second type. For example, the primary storage partition 220 includes a number of MLC memory blocks 240.

In an example, the memory device 200 also implements a hybrid architecture. As such, the memory device 200 also includes a number of hybrid memory blocks 250. The hybrid memory blocks 250 are MLC memory blocks that are part of the primary storage partition 220. However, the hybrid memory blocks 250 are programmable in different modes. For example, the hybrid memory blocks 250 are programmable in a SLC mode or a MLC mode. When the hybrid memory blocks 250 are programmed in the MLC mode, they are included in the primary storage partition 220. However, when the hybrid memory blocks 250 are programmed in the SLC mode, they are included, along with the SLC memory blocks 230, as part of the cache partition 210.

In an example, the memory device 200 is associated with a write abort prediction system. In an example, the write abort prediction system is similar to the write abort prediction system 180 shown and described with respect to FIG. 1. The write abort prediction system periodically or continuously monitors the state of the cache partition 210 and the primary storage partition 220 to determine the operating state.

Figure 3:
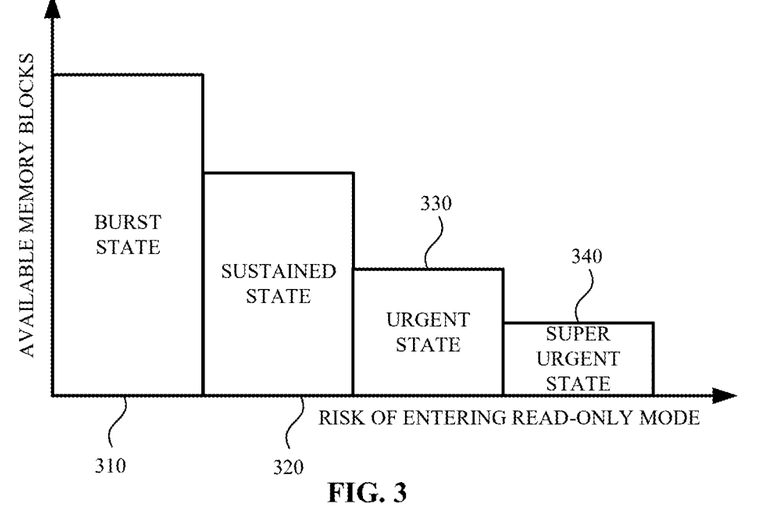
FIG. 3 illustrates how a write abort prediction system uses a determined operating state of a data storage device to determine a risk of the data storage device entering a read-only mode according to an example.

Based on the monitored operating state of each partition and/or on a determined write abort probability, the write abort prediction system (or a controller associated with the memory device 200) determines whether to alter the functionality of the memory device 200 and/or the data storage device. For example and referring to FIG. 3, FIG. 3 illustrates how a write abort prediction system uses a determined operating state of a data storage device to determine a risk of the data storage device entering a read-only mode according to an example. In an example, the write abort prediction system that monitors or determines the operating state of the data storage device is similar to the write abort prediction system 180 shown and described with respect to FIG. 1.

In an example, the operating state of the data storage device is divided into four different states—a Burst State 310, a Sustained State 320, an Urgent State 330 and a Super Urgent State 340. In an example, each state is associated with a number of available memory blocks in the cache partition of the data storage device and/or the primary storage partition of the data storage device.

For example, when the cache partition and/or the primary storage partition are in the Burst State 310, at least a first threshold amount of memory blocks are available in the cache partition and/or the primary storage partition. When the cache partition and/or the primary storage partition are in the Sustained State 320, at least a second threshold amount (the second threshold being less than the first threshold) of memory blocks are available in the cache partition and/or the primary storage partition. Additionally, when the cache partition and/or the primary storage partition are in the Urgent State 330, at least a third threshold amount (the third threshold being less than the second threshold) of memory blocks are available in the cache partition and/or the primary storage partition. When the cache partition and/or the primary storage partition are in the Super Urgent State 340, at least a fourth threshold amount (the fourth threshold being less than the third threshold) of memory blocks are available in the cache partition and/or the primary storage partition.

Thus, as the number of available memory blocks in each partition decreases, the operating state of the data storage device moves from the Burst State 310 to the Sustained State 320, from the Sustained State 320 to the Urgent State 330 and from the Urgent State 330 to the Super Urgent State 340.

As the operating state of the data storage device changes, so does the risk of entering a read-only mode should one or more write aborts occur during the execution of one or more operations. As such, and depending on the write abort probability, the write abort prediction system alters the functionality of the data storage device such as previously described.

Figure 4:
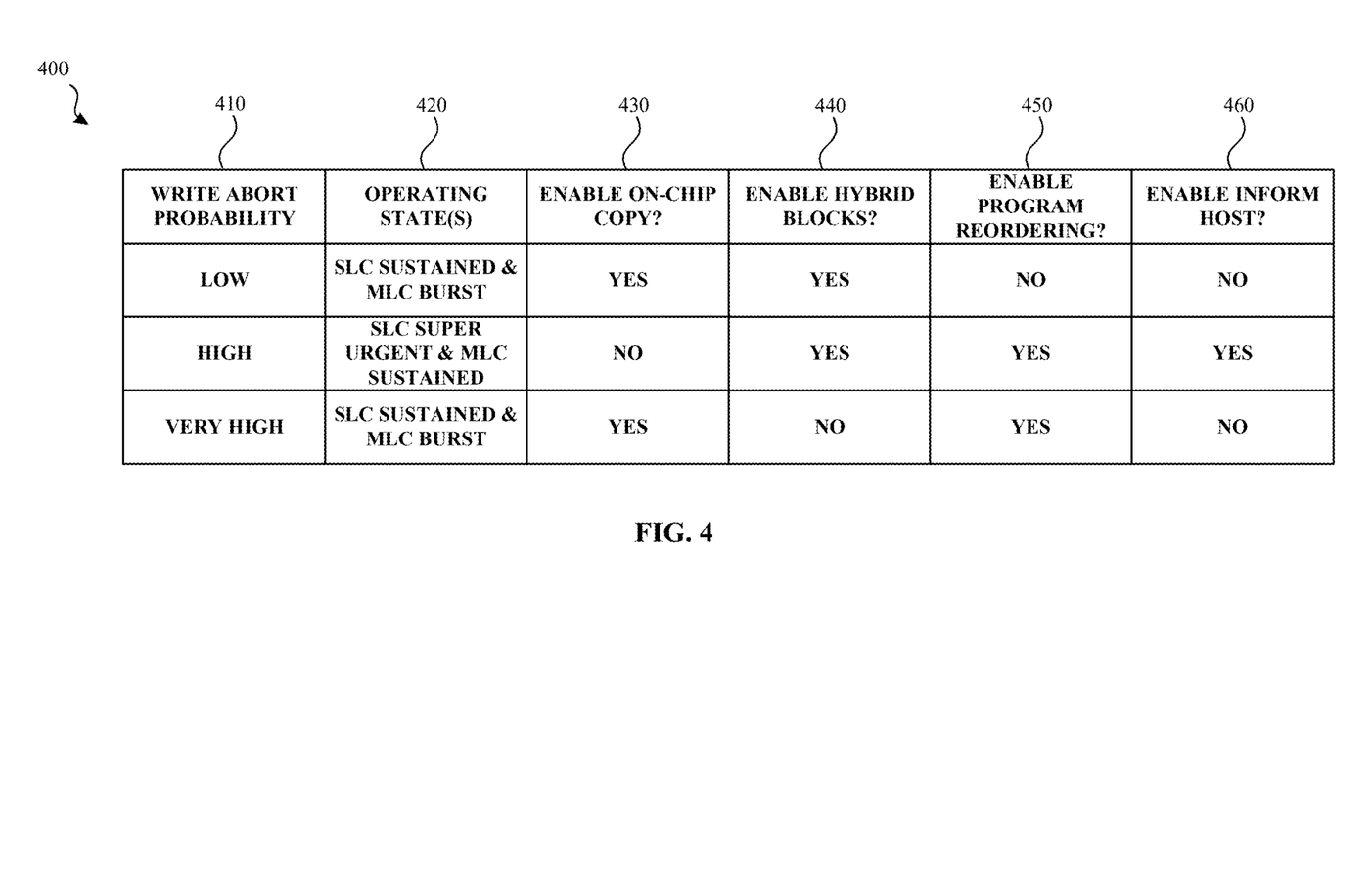
FIG. 4 illustrates a look-up table that is used by a write abort prediction system when determining whether to alter the functionality of a data storage device according to an example.

FIG. 4 illustrates a look-up table 400 that is used by a write abort prediction system when determining whether to alter the functionality of a data storage device according to an example. In an example, the write abort prediction system that uses the look-up table 400 is similar to the write abort prediction system 180 shown and described with respect to FIG. 1. Additionally, the write abort probability 410 and/or the operating state(s) 420 are also determined by the write abort prediction system.

As previously described, the write abort prediction system determines a write abort probability 410 over one or more monitoring periods. In an example, the write abort probability is a probability that indicates whether X amount of write aborts will occur over another monitoring period (where X is a number between 0 and n). In the example shown in FIG. 4, the write abort probability 410 is divided into buckets labeled as "Low", "High" and "Very High".

The write abort prediction system also determines an operating state(s) 420 of the data storage device. In an example, the write abort prediction system determines the operating state(s) 420 of the data storage device when the write abort probability 410 is determined and/or when the write abort probability 410 is above a threshold. In another example, the write abort prediction system determines the operating state(s) 420 of the data storage device independently from determining the write abort probability 410.

Based on the operations state(s) 420 and/or on the write abort probability 410, the write abort prediction system alters the functionality of the data storage device. For example and as shown in FIG. 4, when the write abort probability 410 is "Low", the SLC partition (or the cache partition) is in a sustained state and/or the MLC partition (or primary storage partition) is in the burst state, on-chip copy 430 and hybrid block 440 functionality is enabled, while program reordering 450 and inform host 460 functionality is disabled.

However, when the write abort probability 410 is "High", the SLC partition is in a super urgent state and/or the MLC partition is in the sustained state, on-chip copy 430 is disabled while hybrid block 440 functionality, program reordering 450 and inform host 460 capabilities are all enabled. In yet another example, when the write abort probability 410 is "Very High" and the SLC partition is in the sustained state and the MLC partition is in a burst state, on-chip copy 430 and program reordering 450 are enabled while hybrid blocks 440 and inform host 460 capabilities are disabled.

Although specific examples are shown and described, other combinations of write abort probabilities 410 and operating state(s) 420 may be used to enable and/or disable various capabilities and/or functions of the data storage device. In one example, when the write abort probability 410 is "Low", the write abort prediction system causes the data storage device to enter and/or remain in a default functionality.

For example, if the write abort probability 410 is low and regardless of the determined operating state of one or more of the partitions, on-chip copy 430 and hybrid blocks 440 are enabled while program reordering 450 and inform host 460 capabilities are disabled (e.g., by default). However, in other examples, the functionality of the data storage device is based, at least in part, on the operating states 420 of at least one of the partitions even if the write abort probability 410 is "Low".

Figure 5:
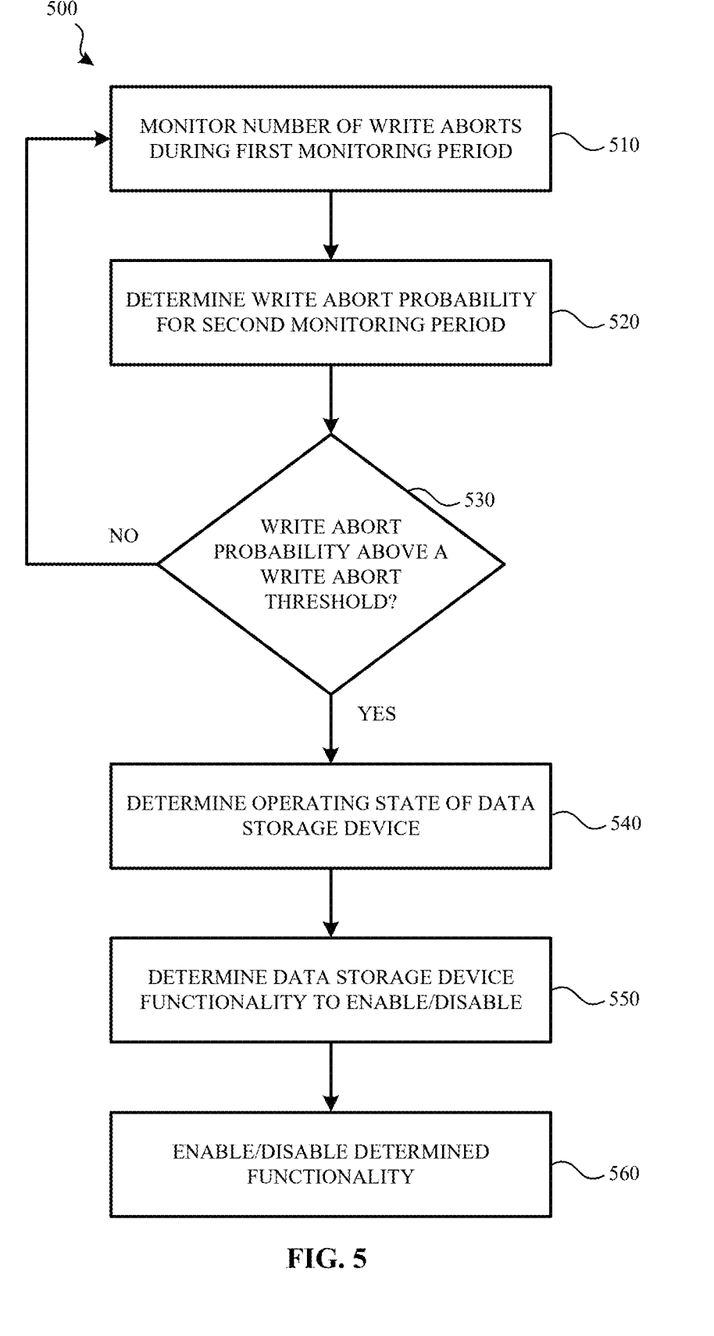
FIG. 5 illustrates a method for dynamically altering the functionality of a data storage device according to an example.

FIG. 5 illustrates a method 500 for dynamically altering the functionality of a data storage device according to an example. In an example, the method 500 is performed by a write abort prediction system (e.g., the write abort prediction system 180) of a data storage device such as, for example, the data storage device 110 shown and described with respect to FIG. 1.

The method 500 begins when the write abort prediction system monitors (510) a number of write aborts that occur during a first monitoring period. In an example, the first monitoring period is a set amount of time. In another example, the first monitoring period is a rolling window of time. In yet another example, the first monitoring period is based on an amount of data written to the data storage device. The amount of data that makes up the first monitoring period may be data that is continuously written to the data storage device (e.g., as a result of a single write operation or multiple write operations in particular period of time, such as when a removable data storage device is connected to a host device) or data that is written to the data storage device over multiple different write operations (e.g., as a result of the removable data storage device being connected to, and disconnected from, the host device).

When the number of write aborts over the first monitoring period have been monitored and/or determined, the write abort prediction system determines (520) a write abort probability for a second monitoring period. In an example, the duration and/or the amount of data associated with the second monitoring period is the same as the duration and/or the amount of data associated with the second monitoring period. In another example, the monitoring periods are different.

In yet another example, the duration and/or the amount of data associated with each monitoring period is adjustable. In such examples, the monitoring periods are based, at least in part, on the amount of available space on the data storage device (or the available space of one or more partitions of the data storage device), an age of the data storage device, a type of the data storage device, a number of P/E cycles executed on the data storage device, the type of data being stored by the data storage device and so on.

The write abort prediction system then determines (530) whether the write abort probability for the second monitoring period is above a write abort threshold. In an example, the write abort threshold is dynamically adjustable based, at least in part, on one or more factors. These factors include, but are not limited to, the amount of available space of the data storage device, an age of the data storage device, a type of the data storage device, a number of P/E cycles executed on the data storage device, the type of data being stored by the data storage device and so on.

If the write abort prediction system determines (530) that write abort probability is not above the write abort threshold, the write abort prediction system continues monitoring (510) the number of write aborts during another monitoring period.

However, if the write abort prediction system determines (530) the write abort probability is above the write abort threshold, the write abort prediction system determines (540) an operating state of the data storage device. For example, the write abort prediction system determines whether one or more partitions of the data storage device are in a Burst State, a Sustained State, an Urgent State and/or a Super Urgent State such as described with respect to FIG. 3.

When the operating state of the data storage device is determined, the write abort prediction system determines (550) functionality of the data storage device that should be enabled/disabled. The write abort prediction system then enables/disables (560) the determined functionality. The method 500 is then repeated.

Figure 6:
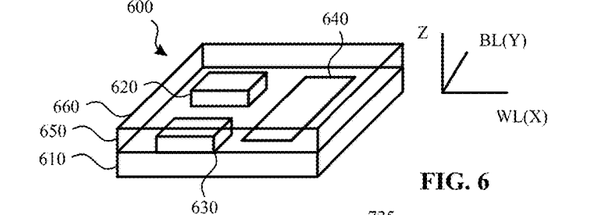
FIG. 6 is a perspective view of a storage device that includes three-dimensional (3D) stacked non-volatile memory according to an example.
Figure 7:
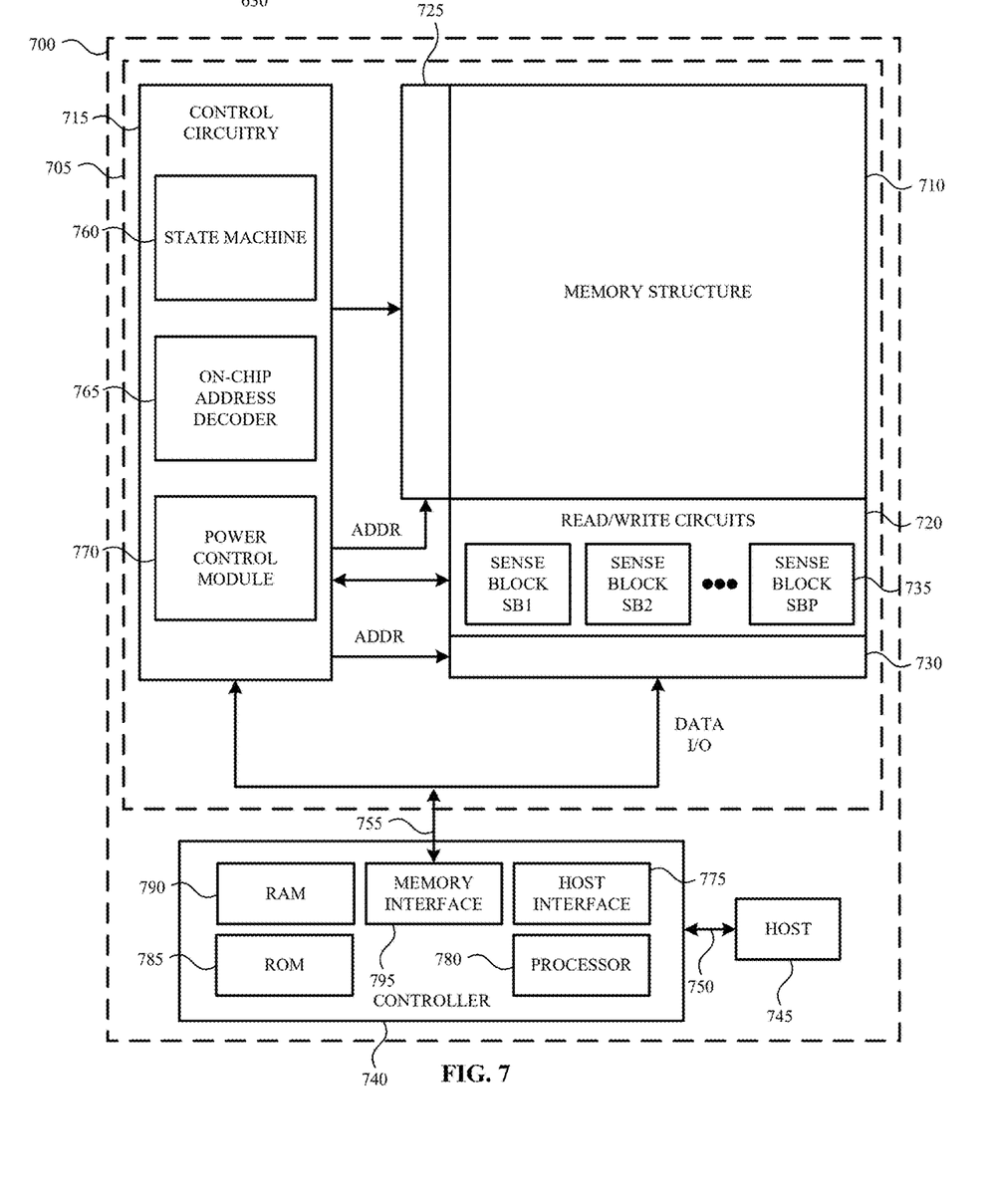
FIG. 7 is a block diagram of a storage device according to an example.

FIG. 6-FIG. 7 describe example storage devices that may be used with or otherwise implement the various features described herein. For example, the storage devices shown and described with respect to FIG. 6-FIG. 7 include various systems and components that are similar to the systems and components shown and described with respect to FIG. 1. For example, the controller 740 shown and described with respect to FIG. 7 is similar to the controller 150 of FIG. 1. Likewise, the memory dies 705 are similar to the first memory die 165 and/or the second memory die 170 of FIG. 1.

FIG. 6 is a perspective view of a storage device 600 that includes three-dimensional (3D) stacked non-volatile memory according to an example. In this example, the storage device 600 includes a substrate 610. Blocks of memory cells are included on or above the substrate 610. The blocks include a first block (BLK0 620) and a second block (BLK1 630). Each block is formed of memory cells (e.g., non-volatile memory elements). The substrate 610 also includes a peripheral area 640 having support circuits that are used by the first block and the second block.

The substrate 610 also carries circuits under the blocks, along with one or more lower metal layers which are patterned in conductive paths to carry signals from the circuits. In an example, the blocks are formed in an intermediate region 650 of the storage device 600. The storage device may also include an upper region 660. The upper region 660 includes one or more upper metal layers that are patterned in conductive paths to carry signals from the circuits. Each block of memory cells includes a stacked area of memory cells. In an example, alternating levels of the stack represent word lines. While two blocks are depicted, additional blocks may be used and extend in the x-direction and/or the y-direction.

In an example, a length of a plane of the substrate 610 in the x-direction represents a direction in which signal paths for word lines or control gate lines extend (e.g., a word line or drain-end select gate (SGD) line direction) and the width of the plane of the substrate 610 in the y-direction represents a direction in which signal paths for bit lines extend (e.g., a bit line direction). The z-direction represents a height of the storage device 600.

FIG. 7 is a functional block diagram of a storage device 700 according to an example. In an example, the storage device 700 is the 3D stacked non-volatile storage device 600 shown and described with respect to FIG. 6. The components depicted in FIG. 7 are electrical circuits. In an example, the storage device 700 includes one or more memory dies 705. Each memory die 705 includes a three-dimensional memory structure 710 of memory cells (e.g., a 3D array of memory cells), control circuitry 715, and read/write circuits 720. In another example, a two-dimensional array of memory cells may be used. The memory structure 710 is addressable by word lines using a first decoder 725 (e.g., a row decoder) and by bit lines using a second decoder 730 (e.g., a column decoder). The read/write circuits 720 may also include multiple sense blocks 735 including SB1, SB2, . . . , SBp (e.g., sensing circuitry) which allow pages of the memory cells to be read or programmed in parallel. The sense blocks 735 may include bit line drivers.

In an example, a controller 740 is included in the same storage device 700 as the one or more memory dies 705. In another example, the controller 740 is formed on a die that is bonded to a memory die 705, in which case each memory die 705 may have its own controller 740. In yet another example, a controller die controls all of the memory dies 705.

Commands and data are transferred between a host 745 and the controller 740 using a data bus 750. Commands and data may also be transferred between the controller 740 and one or more of the memory dies 705 by way of lines 755. In one example, the memory die 705 includes a set of input and/or output (I/O) pins that connect to lines 755.

The memory structure 710 also includes one or more arrays of memory cells. The memory cells may be arranged in a three-dimensional array or a two-dimensional array. The memory structure 710 may include any type of non-volatile memory that is formed on one or more physical levels of arrays of memory cells having an active area disposed above a silicon substrate. The memory structure 710 may be in a non-volatile memory device having circuitry associated with the operation of the memory cells, whether the associated circuitry is above or within the substrate.

The control circuitry 715 works in conjunction with the read/write circuits 720 to perform memory operations (e.g., erase, program, read, and others) on the memory structure 710. The control circuitry 715 may include registers, ROM fuses, and other devices for storing default values such as base voltages and other parameters.

The control circuitry 715 also includes one or more of a state machine 760, an on-chip address decoder 765 and a power control module 770. When included, the state machine 760 provides chip-level control of various memory operations. The state machine 760 is programmable by software. In another example, the state machine 760 does not use software and is completely implemented in hardware (e.g., electrical circuits).

When included, the on-chip address decoder 765 provide an address interface between addresses used by host 745 and/or the controller 740 to a hardware address used by the first decoder 725 and the second decoder 730. When included, the power control module 770 controls power and/or voltages that are supplied to the word lines and bit lines during memory operations. The power control module 770 includes drivers for word line layers in a 3D configuration, select transistors (e.g., SGS and SGD transistors) and source lines. The power control module 770 also includes one or more charge pumps for creating voltages.

The control circuitry 715, the state machine 760, the on-chip address decoder 765, the first decoder 725, the second decoder 730, the power control module 770, the sense blocks 735, the read/write circuits 720, and/or the controller 740 may be considered one or more control circuits and/or a managing circuit that perform some or all of the operations described herein.

In an example, the controller 740, is an electrical circuit that may be on-chip or off-chip. Additionally, the controller 740 may include one or more processors 780, ROM 785, RAM 790, memory interface 795, and host interface 775, all of which may be interconnected. In an example, the one or more processors 780 is one example of a control circuit. Other examples can use state machines or other custom circuits designed to perform one or more functions. Devices such as ROM 785 and RAM 790 may include code such as a set of instructions. One or more of the processors 780 may be operable to execute the set of instructions to provide some or all of the functionality described herein.

Alternatively or additionally, one or more of the processors 780 access code from a memory device in the memory structure 710, such as a reserved area of memory cells connected to one or more word lines. The memory interface 795, in communication with ROM 785, RAM 790, and one or more of the processors 780, may be an electrical circuit that provides an electrical interface between the controller 740 and the memory die 705. For example, the memory interface 795 may change the format or timing of signals, provide a buffer, isolate from surges, latch I/O, and so forth.

The one or more processors 780 may issue commands to control circuitry 715, or any other component of memory die 705, using the memory interface 795. The host interface 775, in communication with the ROM 785, the RAM 790, and the one or more processors 780, may be an electrical circuit that provides an electrical interface between the controller 740 and the host 745. For example, the host interface 775 may change the format or timing of signals, provide a buffer, isolate from surges, latch I/O, and so on. Commands and data from the host 745 are received by the controller 740 by way of the host interface 775. Data sent to the host 745 may be transmitted using the data bus 750.

Multiple memory elements in the memory structure 710 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art. One of skill in the art also will note that while the invention is described in terms of SLC and QLC memory blocks, in some embodiments, triple-level cell (TLC) memory blocks and multi-level cell (MLC) blocks may be substituted for QLC memory blocks.

Based on the above, examples of the present disclosure describe a method, comprising: causing a write abort prediction system of a data storage device to monitor a number of write aborts that have occurred on a data storage device during a first monitoring period; causing the write abort prediction system to determine, based at least in part, on the number of write aborts, a probability of one or more additional write aborts occurring during execution of received commands during a second monitoring period; causing the write abort prediction system to determine whether the probability of one or more additional write aborts occurring during the second monitoring period is above a threshold; based, at least in part, on determining the probability of one or more additional write aborts occurring is above the threshold, causing the write abort prediction system to determine an operating state of the data storage device; and causing the write abort prediction system to alter a functionality of the data storage device based, at least in part, on the operating state of the data storage device and the determined probability. In an example, altering the functionality of the data storage device comprises delaying execution of one or more write commands. In an example, altering the functionality of the data storage device comprises pausing a hybrid memory block implementation. In an example, altering a functionality of the data storage device comprises generating and sending a message to a host device. In an example, altering a functionality of the data storage device comprises reordering an execution of commands on one or more memory dies associated with the data storage device. In an example, the first monitoring period is associated with an amount of data that is written to the data storage device. In an example, the first monitoring period is associated with a period of time. In an example, the operating state of the data storage device is based, at least in part, on one or more of a number of available memory blocks in a first partition of the data storage device and a number of available memory blocks in a second partition of the data storage device. In an example, the threshold is based, at least in part, on the operating state of the data storage device. In an example, at least one of the first monitoring period and the second monitoring period is configurable. In an example, the second monitoring period is a period in which a predetermined amount of data is written to the data storage device.

Examples also describe a data storage device, comprising: a controller; and a write abort prediction system associated with the controller and operable to: monitor a number of write aborts that have occurred on the data storage device during a monitoring period; determine, based at least in part, on the number of write aborts, a probability of one or more additional write aborts occurring when a predetermined amount of data is written to the data storage device; determine whether the probability of one or more additional write aborts occurring is above a write abort threshold; based, at least in part, on determining the probability of one or more additional write aborts occurring is above the write abort threshold, determine an operating state of the data storage device; and alter a functionality of the data storage device. In an example, the monitoring period is associated with an amount of data that is written to the data storage device. In an example, the monitoring period is associated with a period of time. In an example, the operating state of the data storage device is based, at least in part, on one or more of a number of available memory blocks in a first partition of the data storage device and a number of available memory blocks in a second partition of the data storage device. In an example, the write abort threshold is based, at least in part, on the operating state of the data storage device. In an example, the monitoring period is configurable. In an example, the functionality of the data storage device is altered based, at least in part, on the operating state of the data storage device.

Examples also describe a data storage device, comprising: means for monitoring a number of write aborts that have occurred on the data storage device during a first monitoring period; means for determining a probability of one or more additional write aborts occurring during a second monitoring period; means for determining whether the probability of one or more additional write aborts occurring during the second monitoring period is above a write abort threshold; means for determining an operating state of the data storage device, wherein the means for determining the operating state of the data storage device determines the operating state of the data storage device based, at least in part, on the determined probability of one or more additional write aborts occurring being above the write abort threshold; and means for altering a functionality of the data storage device, wherein the functionality that is altered is based, at least in part, on the operating state of the data storage device. In an example, the operating state of the data storage device is based, at least in part, on one or more of a number of available memory blocks in a first partition of the data storage device and a number of available memory blocks in a second partition of the data storage device.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   causing a write abort prediction system of a data storage device to monitor a number of write aborts that have occurred on a data storage device during a first monitoring period;
   causing the write abort prediction system to determine, based at least in part, on the number of write aborts, a probability of one or more additional write aborts occurring during execution of received commands during a second monitoring period;
   causing the write abort prediction system to determine whether the probability of one or more additional write aborts occurring during the second monitoring period is above a threshold;
   based, at least in part, on determining the probability of one or more additional write aborts occurring is above the threshold, causing the write abort prediction system to determine an operating state of the data storage device; and causing the write abort prediction system to alter a functionality of the data storage device based, at least in part, on the operating state of the data storage device and the determined probability.

2. The method of claim 1, wherein altering the functionality of the data storage device comprises delaying execution of one or more write commands.

3. The method of claim 1, wherein altering the functionality of the data storage device comprises pausing a hybrid memory block implementation.

4. The method of claim 1, wherein altering a functionality of the data storage device comprises generating and sending a message to a host device.

5. The method of claim 1, wherein altering a functionality of the data storage device comprises reordering an execution of commands on one or more memory dies associated with the data storage device.

6. The method of claim 1, wherein the first monitoring period is associated with an amount of data that is written to the data storage device.

7. The method of claim 1, wherein the first monitoring period is associated with a period of time.

8. The method of claim 1, wherein the operating state of the data storage device is based, at least in part, on one or more of a number of available memory blocks in a first partition of the data storage device and a number of available memory blocks in a second partition of the data storage device.

9. The method of claim 1, wherein the threshold is based, at least in part, on the operating state of the data storage device.

10. The method of claim 1, wherein at least one of the first monitoring period and the second monitoring period is configurable.

11. The method of claim 1, wherein the second monitoring period is a period in which a predetermined amount of data is written to the data storage device.

12. A data storage device, comprising:
a controller; and
a write abort prediction system associated with the controller and operable to:
monitor a number of write aborts that have occurred on the data storage device during a monitoring period;
determine, based at least in part, on the number of write aborts, a probability of one or more additional write aborts occurring when a predetermined amount of data is written to the data storage device;
determine whether the probability of one or more additional write aborts occurring is above a write abort threshold;
based, at least in part, on determining the probability of one or more additional write aborts occurring is above the write abort threshold, determine an operating state of the data storage device; and
alter a functionality of the data storage device.

13. The data storage device of claim 12, wherein the monitoring period is associated with an amount of data that is written to the data storage device.

14. The data storage device of claim 12, wherein the monitoring period is associated with a period of time.

15. The data storage device of claim 12, wherein the operating state of the data storage device is based, at least in part, on one or more of a number of available memory blocks in a first partition of the data storage device and a number of available memory blocks in a second partition of the data storage device.

16. The data storage device of claim 12, wherein the write abort threshold is based, at least in part, on the operating state of the data storage device.

17. The data storage device of claim 12, wherein the monitoring period is configurable.

18. The data storage device of claim 12, wherein the functionality of the data storage device is altered based, at least in part, on the operating state of the data storage device.

19. A data storage device, comprising:
means for monitoring a number of write aborts that have occurred on the data storage device during a first monitoring period;
means for determining a probability of one or more additional write aborts occurring during a second monitoring period;
means for determining whether the probability of one or more additional write aborts occurring during the second monitoring period is above a write abort threshold;
means for determining an operating state of the data storage device, wherein the means for determining the operating state of the data storage device determines the operating state of the data storage device based, at least in part, on the determined probability of one or more additional write aborts occurring being above the write abort threshold; and
means for altering a functionality of the data storage device, wherein the functionality that is altered is based, at least in part, on the operating state of the data storage device.

20. The data storage device of claim 19, wherein the operating state of the data storage device is based, at least in part, on one or more of a number of available memory blocks in a first partition of the data storage device and a number of available memory blocks in a second partition of the data storage device.

* * * * *